(No Model.)

D. G. WEEMS.
ELECTRIC RAILWAY SYSTEM.

No. 376,567. Patented Jan. 17, 1888.

WITNESSES:

INVENTOR

ATTORNEYS.

(No Model.)  8 Sheets—Sheet 2.

D. G. WEEMS.
ELECTRIC RAILWAY SYSTEM.

No. 376,567.  Patented Jan. 17, 1888.

WITNESSES:

INVENTOR

ATTORNEYS (No Model.) 8 Sheets—Sheet 3.

D. G. WEEMS.
ELECTRIC RAILWAY SYSTEM.

No. 376,567. Patented Jan. 17, 1888.

WITNESSES:
Geo. B. Michael.
Fred. C. Snow.

INVENTOR
David G. Weems
BY
A. H. Evans & C.
his ATTORNEYS.

(No Model.) 8 Sheets—Sheet 4.
D. G. WEEMS.
ELECTRIC RAILWAY SYSTEM.

No. 376,567. Patented Jan. 17, 1888.

(No Model.) 8 Sheets—Sheet 5.
D. G. WEEMS.
ELECTRIC RAILWAY SYSTEM.

No. 376,567. Patented Jan. 17, 1888.

WITNESSES:

INVENTOR

BY his ATTORNEYS (No Model.)  D. G. WEEMS.  8 Sheets—Sheet 6.
ELECTRIC RAILWAY SYSTEM.

No. 376,567.  Patented Jan. 17, 1888.

(No Model.)

D. G. WEEMS.
ELECTRIC RAILWAY SYSTEM.

No. 376,567.

Patented Jan. 17, 1888.

WITNESSES:

INVENTOR

BY

ATTORNEYS (No Model.) 8 Sheets—Sheet 8.

D. G. WEEMS.
ELECTRIC RAILWAY SYSTEM.

No. 376,567. Patented Jan. 17, 1888.

WITNESSES
P. N. Fowler
W. H. Patterson

INVENTOR
David G. Weems
by A. H. Evans & Co
Attorneys

UNITED STATES PATENT OFFICE.

DAVID G. WEEMS, OF BALTIMORE, MARYLAND.

ELECTRIC-RAILWAY SYSTEM.

SPECIFICATION forming part of Letters Patent No. 376,567, dated January 17, 1888.

Application filed March 21, 1887. Serial No. 231,729. (No model.)

*To all whom it may concern:*

Be it known that I, DAVID G. WEEMS, a citizen of the United States, residing in Baltimore, State of Maryland, have invented certain new and useful Improvements in Electric-Railway Systems, of which the following is a full, clear, and exact description, reference being had to the accompanying drawings, forming part of this specification, in which—

My invention relates to an improved electric-railway system for transporting mail, express packages, &c., at a rapid speed over a line of elevated, surface, or underground tracks or rails, using as a motive power electricity, having the motor located in a traveling car or locomotive having attached thereto a series or train of cars, the said train being supplied with means for automatically controlling, starting, and stopping itself; and my invention consists in the improved system and the constructions and combinations of devices which I shall hereinafter fully describe and claim.

To enable others skilled in the art to which my invention appertains to make and use the same, I will now describe a preferred construction and indicate the manner in which the same is carried out.

Figure 1:
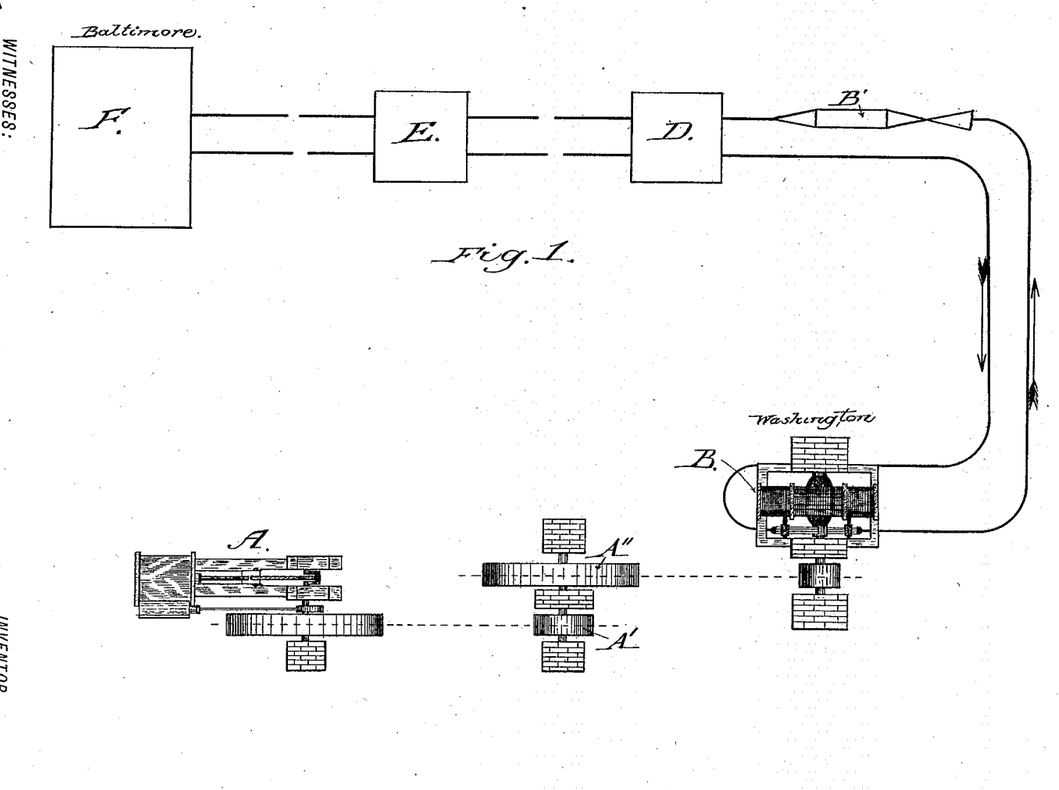
Figure 1 is a diagram representing the two terminals of a section of a road, and showing in plan a dynamo, a stationary engine of high speed, a belt-connection between the engine and dynamo, and illustrating stations or points where additional sources of electric energy may be situated to drive the train.

Referring to Fig. 1, A represents a suitable stationary engine of high speed, having a large band-wheel for transmitting its power through the medium of a belt to a smaller pulley, A′, on the shaft of which is mounted a large pulley, A″, which connects with and drives a small pulley or wheel connecting and driving at a suitable speed a dynamo, B, permanently located at one or both terminals of the road, the said dynamo being electrically connected with a traveling car carrying a suitable motor, whereby the car is propelled by the electric currents in the usual manner.

D and E represent one or more stations located at designated points along the line of road and containing storage-batteries or stationary engines and extra dynamos for renewing the electric energy on lines where the train is to run long distances, and F indicates the opposite end or terminal of the road, at which point may be placed a stationary engine and dynamo similar to A and B, to assist in propelling one or more trains between the two ends of the line.

Figure 2:
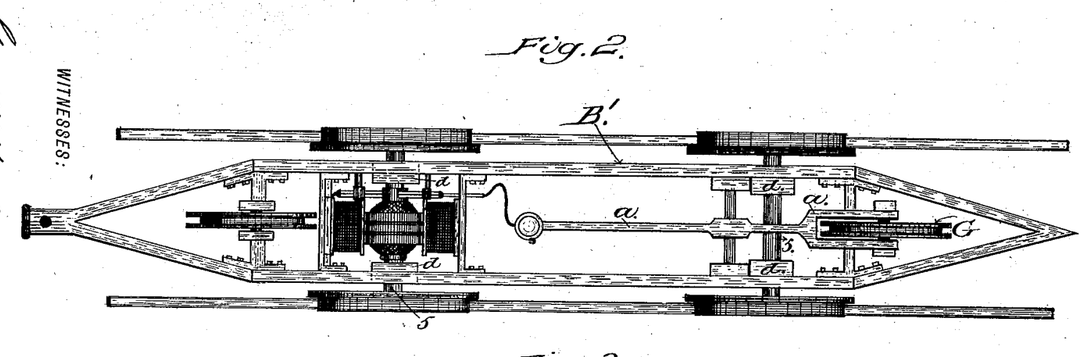
Fig. 2 is a plan view of the traveling car, showing the top removed.
Figure 3:
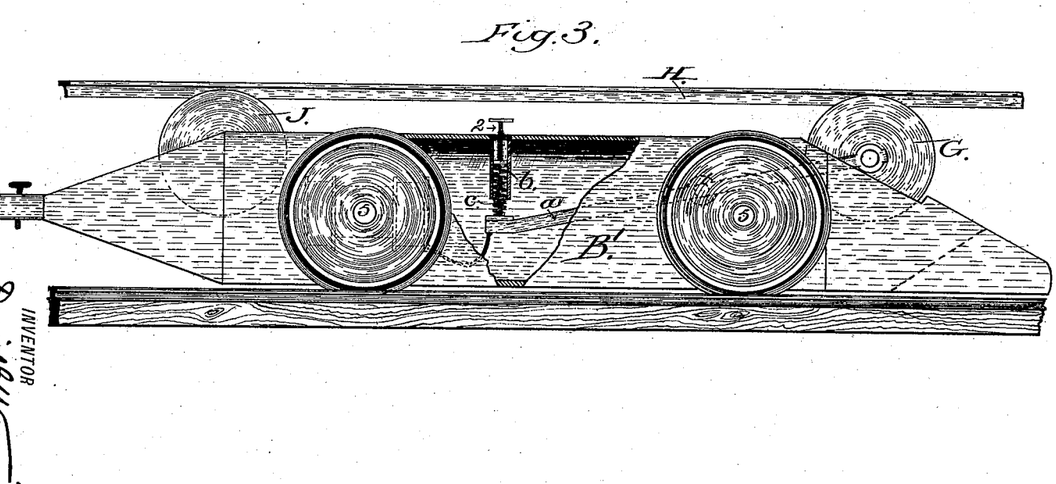
Fig. 3 is a side view of the same.

Referring, now, to Figs. 2 and 3, G indicates a guide-wheel, which bears against and picks up the electric current from the upper rail, H, which, as before stated, is electrically connected with the dynamo B, the said wheel being mounted in a pivoted frame or bar, *a*, which conducts the current to the motor on the car, from whence it passes through one of the driving-wheels to the contiguous lower rail, it being understood that the opposite driving-wheel is properly insulated from the motor. In the opposite end of the car B′ is mounted another guide-wheel, J, also insulated from the motor and serving simply as a guide-wheel to steady the locomotive during its rapid passage, the said guide-wheels G and J being made of as large diameter as practicable to save revolution in rapid travel.

Suitably mounted in the top of the locomotive is a box or bearing, b, having a threaded opening, through which a set-screw, 2, passes and bears upon the top of a spring, c, the lower end of which in turn presses against the end of the conducting-bar a and keeps the guide-wheel G against the rail H, whereby the motor on the car has full benefit of the electric current as it passes from the rail H through the wheel G and rod a.

The axles 5 of the locomotive and succeeding cars are mounted in journal-boxes d d, which are liberally supplied with a liquid lubricating material, so that the train may run at a high rate of speed for a long distance without necessitating any change or refilling of said boxes.

Figure 14:
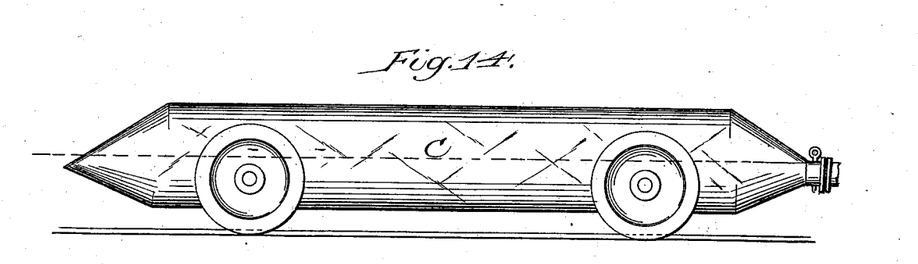
Fig. 14 is a detail of one of the detached cars with its brake mechanism removed.
Figure 15:
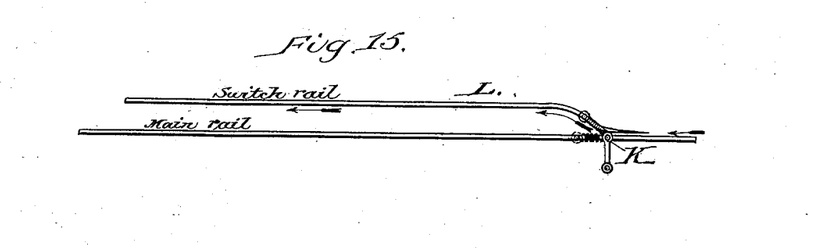
Fig. 15 is a detail showing a key for shifting the current from the main to the switch rail.

The ends of the locomotive and succeeding cars are tapered or cigar-shaped, to effect the necessary displacement of the air when the train is in motion, the resistance of the air on the upper inclined surfaces serving to hold the cars snugly to the track. By making the upper inclined surfaces of one or both ends of the car longer than the lower surfaces—or, in other words, by so locating the extremities of said cars that one or both, but preferably both, of them will lie in a plane below the longitudinal center of said car, as shown in Fig. 14—the air, acting upon the upper or longer incline, will hold the wheels of the locomotive and cars snugly to the tracks—a feature which is impossible in cars having their ends in a line drawn through their centers.

Figure 5:
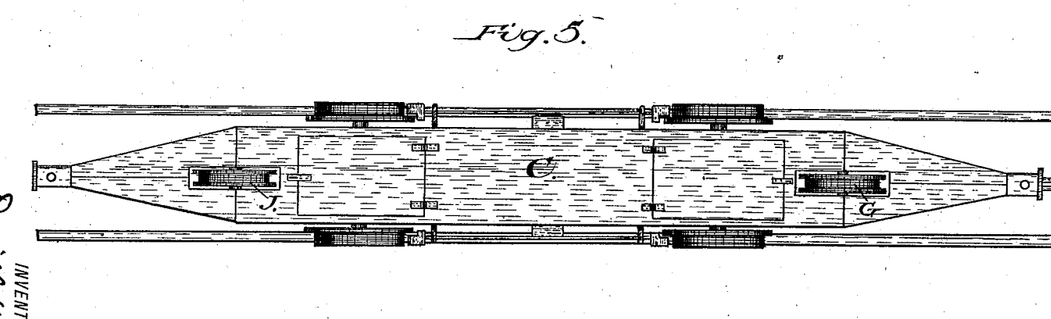
Fig. 5 is a plan view of said car.

Each car and motor is provided with coupling devices, the cars having also doors (see Fig. 5) through which the various articles to be transported are passed.

The car C (illustrated in Figs. 4 and 5) is adapted to be coupled with the locomotive, and is provided with guide-wheels similar to those on the car, which act not only as guides, but also hug the rail H sufficiently close to obviate all danger of the car jumping the track in passing around curves or going up grades under great headway. In this figure, K represents a point located at a suitable distance in advance of where the train will stop, where the electric current is shunted by any suitable contrivance to the switch-rail L, (shown more particularly in Fig. 12,) thereby breaking the circuit between the motor and the conducting-rail H and removing temporarily the propelling agent from the motor.

Figure 4:
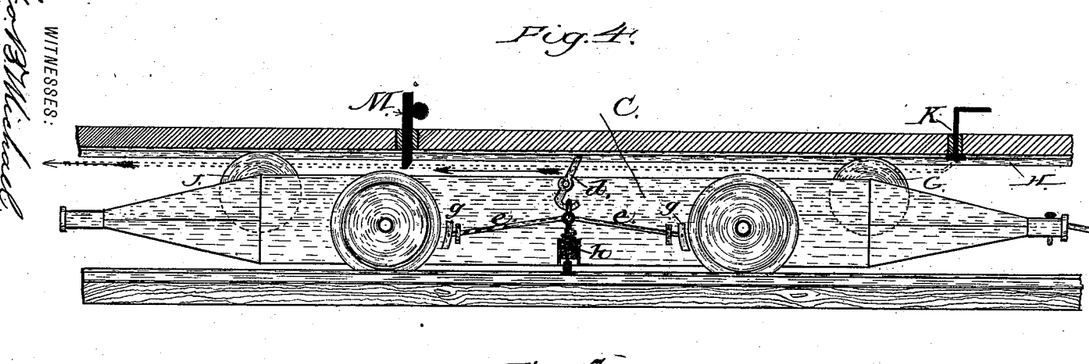
Fig. 4 is a side view of a car designed for carrying mail and packages.
Figure 12:
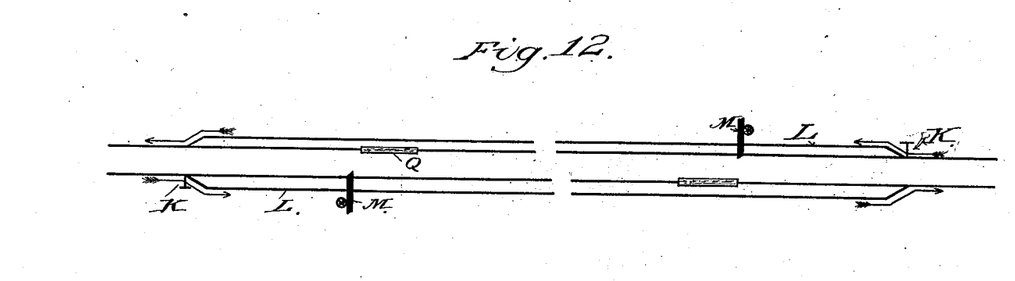
Fig. 12 is a diagram showing the main and switch rails, and indicating the point where the current is switched off, the point where the brakes are automatically applied, and a buffer to check the momentum of the train.

At a suitable distance from the point K—as, for instance, at M in Figs. 4 and 12—is located a mechanically or electrically operated stop, which is let into the tube or tunnel, so that its lower end may be engaged by the upper end of a lever or latch, d, pivoted upon the side of the car, and having its lower end hook-shaped and engaging a link or staple which is attached to or forms a portion of the brake-rods e, carrying the brake-shoes g and connected with a stout spring, h, the tendency of which is to straighten out the rods e and force the brake-shoes against the wheels.

From this description it is manifest that when the current is shifted to the switch-rail L and the power of motor removed the momentum of the train gradually decreases until the point M is reached, when the latch d strikes the stop at that point and disconnects itself with the brake rods, thereby permitting the spring h to draw said rods down, forcing the brake-shoes tightly against the wheels and automatically stopping the train a short distance from the point where the brakes were applied and at a point near where the current leaves the switch-rail again. When it is desired to again start the train, the brakes are set and the train electrically or mechanically moved forward to the point where the current again passes onto the main rail, the set-screws or adjusting mechanism 8 regulating the strength of the springs and the power of the brakes. It will thus be seen that the train can be stopped by its own movement at any point on the line where there has been established a stop or abutment.

Figure 6:
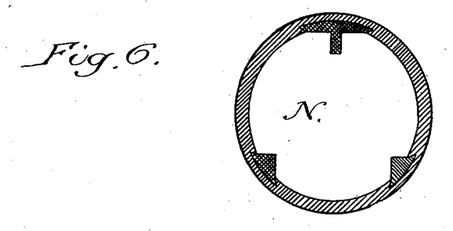
Fig. 6 represents a cross-sectional view of a tube or pipe, showing the upper and lower rails.
Figure 7:
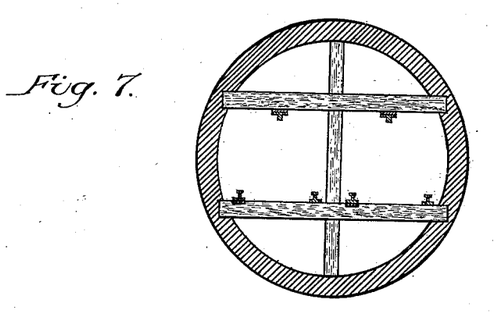
Fig. 7 is a similar view of a tube or pipe of large diameter, adapted for underground or surface railway, divided longitudinally into two compartments, each having upper and lower rails.
Figure 8:
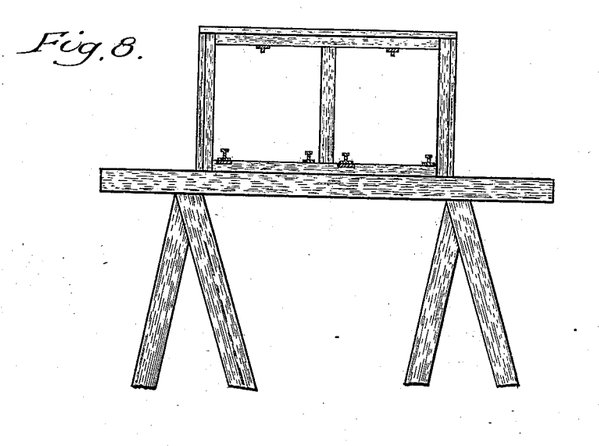
Fig. 8 illustrates a cross-sectional view of a frame suitable for elevated roads embodying my invention.

In operating my system tubes or passages similar to those shown in Figs. 6, 7, and 8 may be used.

In Fig. 6 is shown a cross-sectional view of a tube or pipe, N, having lower bearing-rails and upper electrically-charged guide-rail. When this tube N is used, it will be in conjunction with a small motor to carry messages, and thus take the place of the pneumatic tube now in use.

Fig. 7 shows a cross-section of a line built underground and carrying a double track, the advantage of which construction is that a moving train will in this instance meet with less resistance from the air in the tube than when a tube like that shown in Fig. 6 is used, as the air will be divided and forced to one side, instead of resisting the movement of the train as it passes through said tube.

Figure 9:
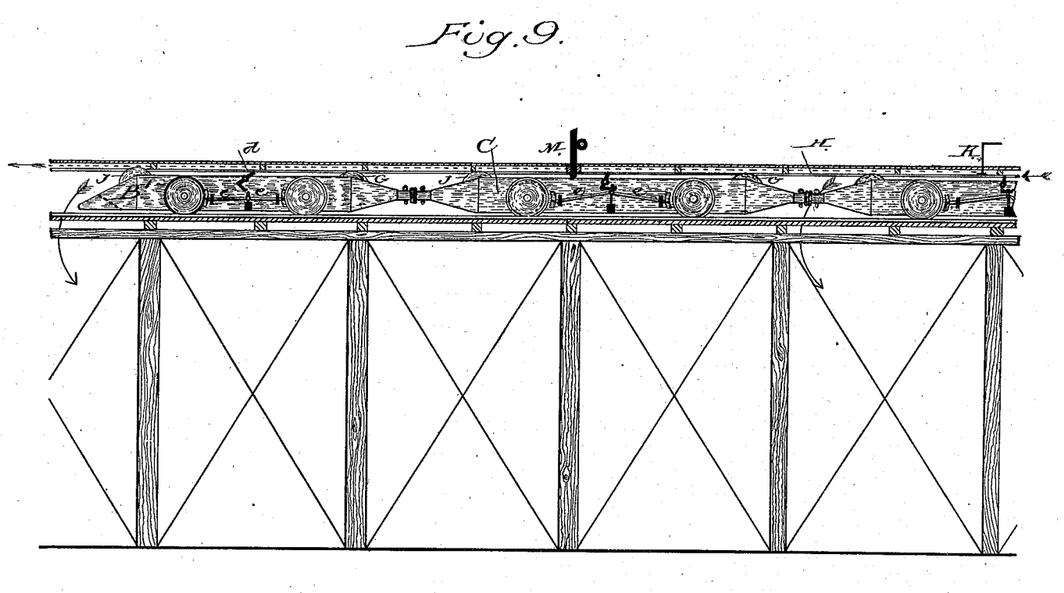
Fig. 9 represents a side view of a section of elevated road, showing a train passing a point where the electric current is cut off and the brakes about to be applied.
Figure 10:
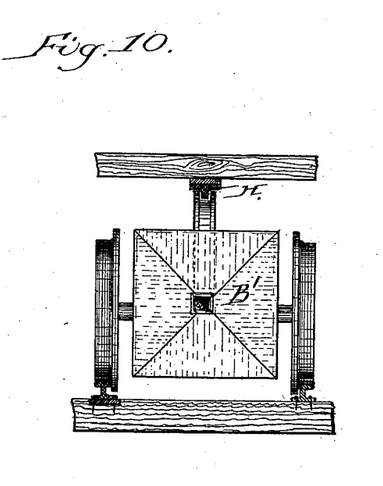
Fig. 10 represents an end view of a car and a transverse sectional view of the tracks, showing the upper rail, which serves both as a conductor and guide-rail.
Figure 11:
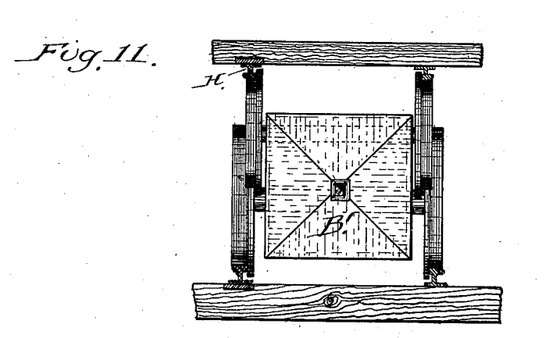
Fig. 11 is a modification of Fig. 10, showing two upper guide-rails, one of which serves as a conductor for the electric current.

In Figs. 8 and 9 another form of tube is shown. In this case the tube is elevated above-ground and open at the bottom, whereby the air is divided by the pointed ends of the cars and forced downward through the open bottom of the tunnel or tube.

Figure 13:
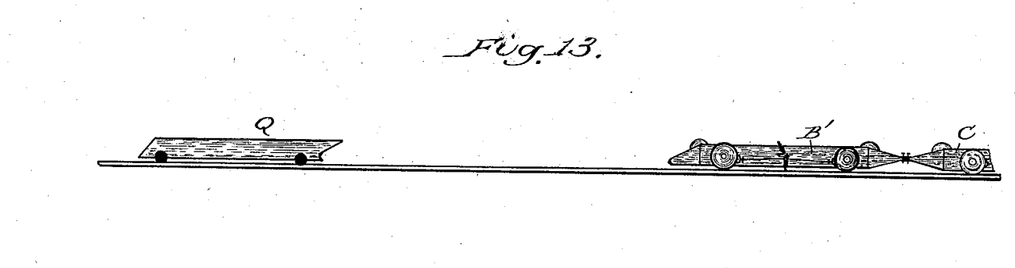
Fig. 13 is a side elevation of the same.

Figs. 12 and 13 show a diagram of a section of a road as it enters the station. When the train is desired to be stopped, the electric current is turned off at the point K, thereby taking away from the motor its power. When the train arrives at the point M, the distance being prearranged from point K to point M, so that the momentum force of the train will gradually slacken its speed and come in at a reduced speed at the point M, the automatic brakes are sprung, as before stated, to brake the wheels with any desired power, thereby stopping the train at the point wished. The movable sliding buffer $q$ shown in said figures is arranged so as to assist in stopping the train, if necessary, at any point desired, should the brakes fail to do their work.

Having thus described my invention, what I claim as new, and desire to secure by Letters Patent, is—

1. In an electric-railway system, the combination, with a series of adjustable stops, of a brake mechanism applied to the cars of a train and comprising a pivoted latching-lever engaging said stops, and spring-actuated rods carrying brake-shoes and checking the train when the trip-lever is released.

2. In an electric-railway system, a car having an electric motor, the main and upper guide-rails forming with said car an electric circuit, in combination with a brake mechanism comprising brake-shoes, rods, and a trip-lever applied to said car, adjustable stops M, engaging said lever, a switch-rail, and a switch in advance of the adjustable stop for transferring the current from the main to the switch rails.

3. In an electric-railway system, the main rails and an upper guide-rail, in combination with a traveling car having an electric motor, and a brake mechanism comprising brake-shoes, rods, and pivoted trip-lever, a switch-rail, means for shifting the electric current from the main to the switch rail, and adjustable stops in the path of the trip-lever for setting the brakes, whereby the car is stopped.

4. In an electric-railway system, the main and the upper guide-rail, a car having a motor, a brake mechanism on said car connected with a trip-lever, and a switch-rail, in combination with means for transferring the current from the main and upper rails and car to the switch-rails, and adjustable stops actuating the trip-lever to stop the car before the current is again returned thereto.

5. An electric car pointed at both ends and having its extremities below its longitudinal center, whereby a greater resisting upper surface is provided to hold the wheels to the track.

6. An electric-railway system comprising the main and the upper guide-rails, traveling cars provided with guide-wheels engaging the latter rails, an electric connection between one of said wheels and rail and the motor on the car, brake mechanism on said cars actuated by fixed stops on the line, and an elevated frame-work on which the rails are laid and in which the cars travel, as herein described.

7. In an electric-railway system, the main and an upper guide-rail, in combination with a car having a motor in electric connection with said rails, a brake mechanism on said car comprising a trip-lever operated by fixed stops on the line, the spring $h$, and the brake-rod $e$, connected with the spring and trip-lever.

8. An improved electric railway for transporting articles, comprising the stationary dynamos, the traveling locomotive and attached cars, the stations, an upper conducting-rail, and lower bearing-rails, in combination with brake mechanism on said locomotive and cars, pivoted latches connected therewith, fixed stops or abutments at points on the road for automatically applying said brakes, a switch-rail, and means for transferring the current from the main to the switch rail, substantially as set forth.

DAVID G. WEEMS.

Witnesses:
BAKER JOHNSON,
GEO. B. MICHAEL.